May 18, 1926.

E. H. ARCHER 1,585,070

CLINKER EXTRACTING SHOVEL

Filed Sept. 3, 1925

Inventor
Elbert H. Archer
By Frank H. Schwartz
Attorney

Patented May 18, 1926.

1,585,070

UNITED STATES PATENT OFFICE.

ELBERT H. ARCHER, OF COVINGTON, VIRGINIA, ASSIGNOR TO COVINGTON MACHINE COMPANY, INC., OF COVINGTON, VIRGINIA, A CORPORATION OF VIRGINIA.

CLINKER-EXTRACTING SHOVEL.

Application filed September 3, 1925. Serial No. 54,213.

This invention relates to shovels for use on machines for extracting clinker or other material from furnaces, ovens, retorts, etc., and comprises all improvements over the prior art which are disclosed in this application. The shovel is particularly adapted for use in extracting clinker in the hot condition from zinc oxide furnaces of the rectangular, square round or tunnel type. The shovel may also be used to extract clinker or other material from lead oxide or other furnaces, ovens, retorts, etc.

When coal is burned with zinc ore in a zinc oxide furnace, a tough comparatively thin clinker is left on the grate bars. To remove this clinker from the furnace, an extractor broadly similar to that shown in Patent 768,067 to McConnell is used. But the shovel head must be so constructed that it will effectively dig under the thin tough clinker instead of riding over the top of it. This requires that the ram bar and its connection to the shovel head shall be strong and rigid and if the clinker is to be extracted in the hot condition, (thereby speeding up production) special precautions must be taken to prevent destruction or rapid deterioration of the shovel head and ram bar from overheating. This is preferably accomplished by cooling the shovel head and ram bar by a cooling medium such as water.

The above and other objects which will hereinafter appear, are attained by new and useful improvements as disclosed in this application. To enable others skilled in the art to fully understand the essential features of the improvements, drawings have been annexed as a part of this disclosure.

Figure 1:
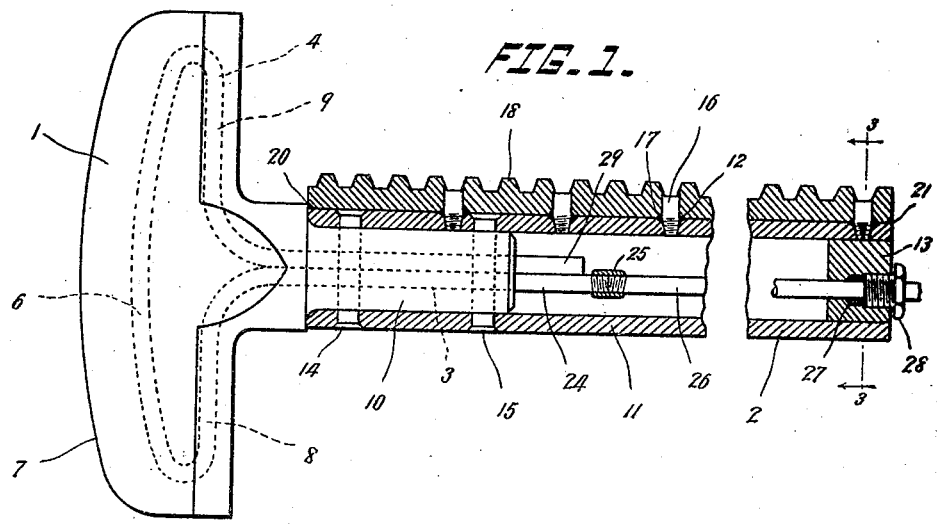
Fig. 1 is a top plan view of the shovel head and ram bar with the ram bar in section.
Figure 2:
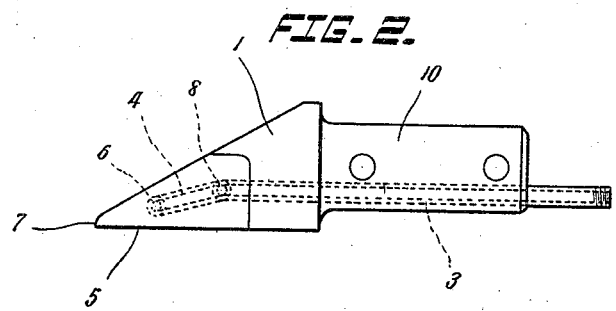
Fig. 2 is a side view of the shovel head.
Figure 3:
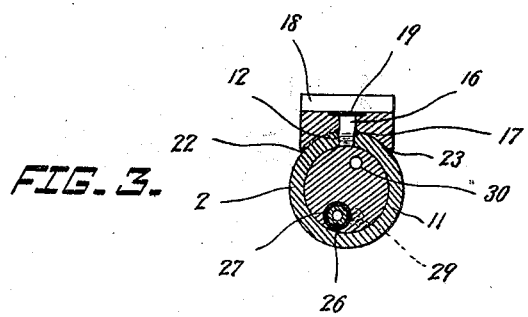
Fig. 3 is a sectional view of the outer end of the ram bar on line 3—3 of Fig. 1.

The shovel comprises a shovel head 1 and a ram bar 2. The shovel head is preferably made by bending a piece of pipe 3 to the shape shown with a loop 4 and casting the head 1 around it with a chilled bottom surface 5 which is therefore harder and more durable. It will be observed that loop 4 comprises a front portion 6 paralleling a major portion of the front edge 7, and two rear portions 8, 9, near the rear of the shovel head. Thence the two portions of the pipe extend rearwardly through the stem 10.

Ram bar 2 comprises ram bar tube 11 and rack 18.

Ram bar tube 11 is provided with a plurality of preferably pipe threaded holes 12. Also a plug 13 is secured in the outer end of the tube 11 by means of a shrink fit. The shovel end of the tube 11 is heated and pushed over the stem 10 and allowed to shrink thereon. Then holes are drilled through tube 11 and stem 10 and pins 14, 15 are riveted therein as shown. Holes 12 are countersunk slightly and studs or pins 16 are secured in holes 12. The studs 16 are welded to tube 11 at 17 in the countersink in holes 12 to make a thoroughly water-tight joint. Rack 18 is provided with suitable holes to fit over the studs 16. The underside of these holes in the rack is countersunk to clear the weld 17. The ends of the studs 16 are melted down to form welded heads 19 to secure the rack to tube 11. The rack is then welded to the tube 11 at ends 20, 21 and along the side edges 22, 23, as an additional precaution against water leakage from around studs 16 should one of the studs be cracked or a weld leak slightly. Another important reason for welding the rack to the tube along side edges 22, 23 is to give additional stiffness to the ram bar.

One end 24 of the pipe is connected by coupling 25 to pipe 26 which is extended through a hole in plug 13 and made watertight therein by packing 27 and screw plug 28. Pipe 26 is connected to any suitable water supply preferably by means of a hose to afford flexiblity, so as not to interfere with the normal operation of the shovel. After circulating through the pipe in the shovel head, the water empties from pipe end 29 into the interior of ram bar tube 11. Opening 30 provides an overflow for the water, and owing to its position, normally maintains the ram bar tube 11 nearly full of water. Thus it will be seen that the circulation of water through pipe 3 will carry away the heat from the shovel head and stem, even though the shovel be used to extract clinker while it is in a highly heated condition. Also as the ram bar tube 11 is nearly full of water at all times, it will assist in the cooling operation.

All changes which properly come within the spirit and range of equivalency of the following claims are intended to be embraced within the scope of the claims.

I claim:

1. A clinker extracting shovel comprising, a head provided with a continuous tube-like passage in the form of a loop for water to enter one end of said passage, to circulate through the head, and to exit at the other end of said passage.

2. The shovel set forth in claim 1 in which the head has a forward lower edge and the forward part of the loop is adjacent a major portion of the forward lower edge of the head.

3. The shovel set forth in claim 1 in which the head has a rearwardly extending stem and the entering and exit portions of the passage extend through the stem.

4. The shovel set forth in claim 1 in which the head is cast around a pipe to provide the passage.

5. A clinker extracting shovel comprising, a head, a tubular ram bar extending rearwardly from said head, a continuous tube-like passage comprising a portion in the form of a loop in said head and one end of said passage opening into the tubular ram bar.

6. The shovel set forth in claim 5 in which the other end of said passage opens through the outside of said ram bar.

7. The shovel set forth in claim 5 in which the rear end of the tubular ram bar is partially closed, and the other end of said passage extends through the tubular ram bar and through said partly closed end.

8. A clinker extracting shovel comprising, a head, a hollow tubular ram bar extending rearwardly from said head, a rack extending alongside the ram bar and the lateral edges of the rack in contact with the ram bar being welded to the ram bar.

9. The shovel set forth in claim 8 in which the ram bar and rack are interengaged by studs welded to the ram bar.

10. A clinker extracting shovel comprising, a head having a rearwardly extending stem, and a ram bar having a tubular end shrunk upon said stem.

11. The shovel set forth in claim 10 in which the stem and ram bar are also interengaged by pins.

ELBERT H. ARCHER.